United States Patent
Liimatainen (10) Patent No.: US 10,223,107 B2
(45) Date of Patent: Mar. 5, 2019

(54) SUPPORTING THE PROVISION OF SERVICES

(75) Inventor: Pasi P. Liimatainen, Lempaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/402,247

(22) PCT Filed: May 29, 2012

(86) PCT No.: PCT/IB2012/052672
§ 371 (c)(1),
(2), (4) Date: Jan. 27, 2015

(87) PCT Pub. No.: WO2013/179086
PCT Pub. Date: Dec. 5, 2013

(65) Prior Publication Data
US 2015/0140974 A1    May 21, 2015

(51) Int. Cl.
*G06F 9/44* (2018.01)
*G06F 8/74* (2018.01)
(Continued)

(52) U.S. Cl.
CPC ............... *G06F 8/74* (2013.01); *G06T 17/00* (2013.01); *H04W 4/50* (2018.02); *H04W 4/60* (2018.02)

(58) Field of Classification Search
CPC ......... G06F 17/30038; G06F 17/30056; G06F 17/30247; G06F 17/3028; G06F 17/30964; G06F 17/30265; H04L 67/42
See application file for complete search history.

(56) References Cited

U.S. PATENT DOCUMENTS

| | | | |
|---|---|---|---|
| 8,405,680 B1 * | 3/2013 | Cardoso Lopes | G06T 19/00 345/426 |
| 2002/0090132 A1 * | 7/2002 | Boncyk | G06F 17/30256 382/154 |

(Continued)

FOREIGN PATENT DOCUMENTS

| WO | 2010075456 A1 | 7/2010 |
|---|---|---|
| WO | 2012061760 A2 | 5/2012 |

OTHER PUBLICATIONS

International Search Report and Written Opinion received for corresponding Patent Cooperation Treaty Application No. PCT/IB2012/052672, dated May 29, 2012, 20 pages.

(Continued)

*Primary Examiner* — Frantz Bataille
(74) *Attorney, Agent, or Firm* — Alston & Bird LLP (57) ABSTRACT

For offering of services to a user, an object model of a real world object is created based on captured data on the real world object. Information linking a service to the model and identifying a type of the service is associated with the model. The model and the associated information may be provided for use in a mobile device. At a mobile device, captured data on an environment of the mobile device is evaluated to find a match to a model that is stored in the mobile device along with the associated information. When a match is found, a type of a service is determined that is linked to the matching model based on information associated with the model, and an action supporting a provision of the service to a user is caused taking account of the determined type of service.

17 Claims, 5 Drawing Sheets

(51) Int. Cl.
  *G06T 17/00* (2006.01)
  *H04W 4/50* (2018.01)
  *H04W 4/60* (2018.01)

(56) References Cited

U.S. PATENT DOCUMENTS

| | | | | |
|---|---|---|---|---|
| 2006/0230073 | A1* | 10/2006 | Gopalakrishnan | ........................... G06F 17/30038 |
| 2008/0278486 | A1* | 11/2008 | Royan | ..................... G06T 15/40 345/420 |
| 2009/0290014 | A1* | 11/2009 | Takata | ................... G06F 1/1626 348/61 |
| 2010/0302247 | A1 | 12/2010 | Perez et al. | |
| 2011/0109617 | A1 | 5/2011 | Snook et al. | |
| 2012/0289147 | A1* | 11/2012 | Raleigh | ............... H04L 67/2847 455/3.06 |
| 2013/0129218 | A1* | 5/2013 | Barrett | ................. G06Q 20/401 382/182 |

OTHER PUBLICATIONS

Keil, et al., "The House of Olbrich-An Augmented Reality Tour through Architectural History". In: 2011 IEEE International Symposium on Mixed and Augmented Reality—Arts, Media and Humanities (ISMAR-AMH). Oct. 26-29, 2011, Basel, Switzerland. ISBN 978-1-4673-0059-9, p. 15-18.
Brunelli and Poggio, "Face Recognition: Features versus Templates" In: IEEE Transactions on Pattern Analysis and Machine Intelligence. vol. 15, No. 10, Oct. 1993, pp. 1042, 1052.
Wikipedia: Computer vision, <http://en.wikipedia.org/wiki/Computer_vision> downloaded Apr. 26, 2012.
Anton and Svasta, "Electronic Components Identified by Computer Vision using Mobile Devices". In 2011 IEE 17th International Symposium for Design and Technology in Electronic Packaging (SIITME), Oct. 20-23, 2011, Timisoara, Romania. ISBN 978-1-4577-1277-7, pp. 179-182.
Broll, et al., "Mobile Interaction with Web Services through Associated Real World Objects", Sep. 9-12, 2007.
Broll, et al., "Collect&Drop: A Technique for Multi-tag Interaction with Real World Objects and Information", Collect&Drop: A Technique for Multi-tag Interaction with Real World Objects and Information.
Cheshire,et al., "Multicast DNS—draft-cheshire-dnsext-multicastdns-15", Dec. 9, 2011.
Suzuki, et al., "u-Photo: Interacting with Pervasive Services using Digital Still Images", Pervasive'05, pp. 190-207.
Vanderhulst, et al., "Photo-Based User Interfaces: Picture It, Tag It, Use It", OTM '09 Proceedings of the Confederated International Workshops and Posters on on the Move to Meaningful Internet Systems: ADI, CAMS, EI2N, ISDE, IWSSA, MONET, OnToContent, ODIS, ORM, OTM Academy, SWWS, SEMELS, Beyond SAWSDL, and COMBEK 2009, pp. 610-615.
Reikimoto, et al., "The World through the Computer: Computer Augmented Interaction with Real World Environments", UIST '95 Proceedings of the 8th annual ACM symposium on User interface and software technology, pp. 29-36.
Haritaoglu, I., "InfoScope: Link from Real World to Digital Information Space", UbiComp '01 Proceedings of the 3rd international conference on Ubiquitous Computing, pp. 247-255.
Wikipedia, Computer-aided design <http://en.wikipedia.org/w/index.php?title=Computer-aided_design&oldid=493632664> downloaded Apr. 5, 2013.

* cited by examiner

SUPPORTING THE PROVISION OF SERVICES

RELATED APPLICATION

This application was originally filed as Patent Cooperation Treaty Application No. PCT/IB2012/052672 filed May 29, 2012.

FIELD OF THE DISCLOSURE

The invention relates to the field of services. It relates in particular to supporting the provision of services to a user by means of a mobile device.

BACKGROUND

When a person is in the vicinity of a real world object, he/she may wish to make use of a service that is related to the object using a mobile device, like a smartphone. Useful services can range from the presentation of descriptive information or status information on the object to the enablement of complex interactions in order to operate the object.

Usually, a person has to perform some kind of service discovery in order to find such a service, if available.

SUMMARY OF SOME EMBODIMENTS OF THE INVENTION

For a first aspect of the invention a method is described, which comprises receiving captured data on an environment of a mobile device. The method further comprises evaluating whether the captured data can be matched to an object model stored in the mobile device, the mobile device storing at least one object model and associated information, wherein the associated information links a service to the object model and identifies a type of the service. The method further comprises, when a matching object model is found, determining a type of a service that is linked to the matching object model based on information associated with the matching object model, and causing an action supporting a provision of the service to a user taking account of the determined type of service.

For a second aspect of the invention a method is described, which comprises creating an object model of a real world object based on captured data on the real world object. The method further comprises associating information to the object model, wherein the associated information links a service to the object model and identifies a type of the service. The method further comprises providing the object model and the associated information for use in a mobile device.

For each of the aspects of the invention, moreover a first apparatus is described, which comprises means for realizing the actions of the method presented for the first and/or second aspect of the invention.

The means of these apparatuses can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit.

For each of the aspects of the invention, moreover a second apparatus is described, which comprises at least one processor and at least one memory including computer program code, the at least one memory and the computer program code configured to, with the at least one processor, cause an apparatus at least to perform the actions of the method presented for the first and/or second aspect of the invention.

For each of the aspects of the invention, moreover a non-transitory computer readable storage medium is described, in which computer program code is stored. The computer program code causes an apparatus to realize the actions of the method presented for the first and/or second aspect of the invention when executed by a processor.

The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the computer program code by itself has to be considered an embodiment of the invention.

Any of the described apparatuses may comprise only the indicated components or one or more additional components.

Any of the described apparatuses for the first and second aspect may be a module or a component for a device, for example a chip. Alternatively, any of the described apparatuses for the first aspect may be a mobile device, and any of the described apparatuses for the second aspect may be any device configured to create an object model, including stationary devices and mobile devices.

In one embodiment, the described methods are information providing methods, and the described first apparatus for each aspect is an information providing apparatus. In one embodiment, the means of the described first apparatus for each aspect are processing means.

In certain embodiments of the described methods, the methods are methods for supporting the provision of a service to a user. In certain embodiments of the described apparatuses, the apparatuses are apparatuses for supporting the provision of to a user.

In one embodiment, the described methods are information providing methods, and the described first apparatuses are information providing apparatuses. In one embodiment, the means of the described first apparatuses are processing means.

It is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
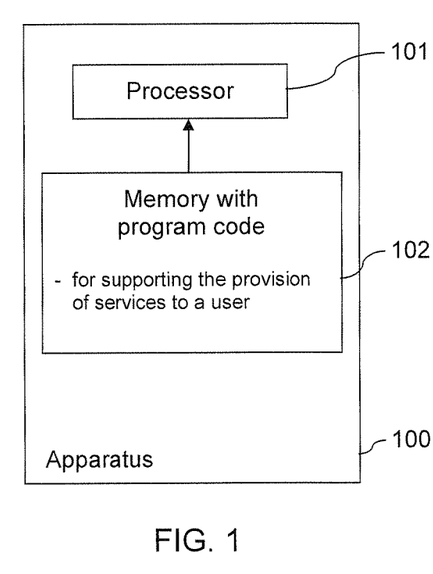
FIG. 1 is a schematic block diagram of an exemplary embodiment of an apparatus according to the first aspect of the invention.

FIG. 1 is a schematic block diagram of an apparatus 100. Apparatus 100 comprises a processor 101 and, linked to processor 101, a memory 102. Memory 102 stores computer program code for supporting a provision of services to a user. Processor 101 is configured to execute computer program code stored in memory 102 in order to cause an apparatus to perform desired actions.

Apparatus 100 could be a mobile device, like a smartphone or a video camera, etc. Apparatus 100 could equally be a module for a mobile device, like a chip or circuitry on a chip. Apparatus 100 is an exemplary embodiment of any apparatus according to the first aspect of the invention. Optionally, apparatus 100 could have various other components, like a further memory, a further processor, a receiver/transmitter or any other interface supporting an exchange of data with other devices, a mobile communication interface, an interface for a local radio link, a user interface, a still image camera, a video camera, a multiview camera, a stereo camera, other depth mapping sensors, a satellite signal receiver, a memory card slot, a universal serial bus (USB) receptacle or an interface for any other kind of removable media, an interface for any other kind of local connectivity, etc.

Figure 2:
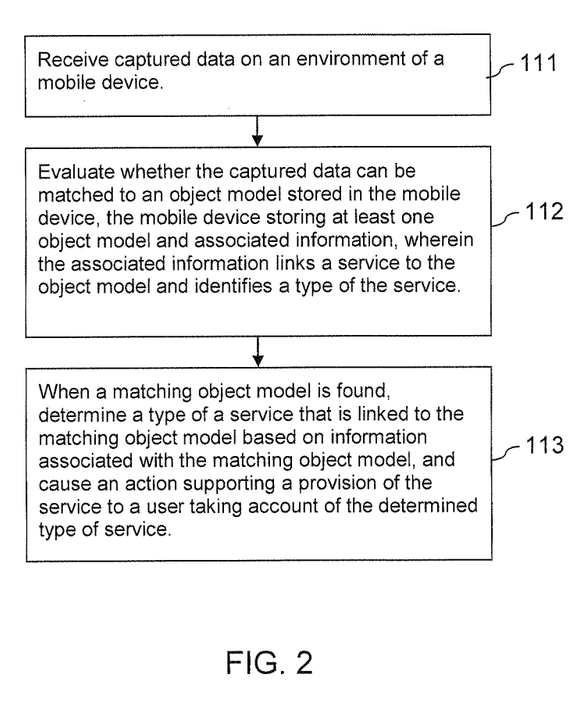
FIG. 2 is a flow chart illustrating an exemplary operation in the apparatus of FIG. 1.

An operation of apparatus 100 will now be described with reference to the flow chart of FIG. 2. The operation is an exemplary embodiment of a method according to the first aspect of the invention. Processor 101 and the program code stored in memory 102 cause an apparatus to perform the operation when the program code is retrieved from memory 102 and executed by processor 101. The apparatus that is caused to perform the operation can be apparatus 100 or some other apparatus, in particular a mobile device comprising apparatus 100.

The apparatus receives captured data on an environment of a mobile device. (action 111) The data can be captured by a camera or other sensors of the mobile device or by an external camera or external sensors.

The apparatus evaluates whether the captured data can be matched to an object model stored in the mobile device. The mobile device stores at least one object model and associated information. The associated information links a service to the object model and identifies a type of the service. (action 112)

Whenever a matching object model is found, the apparatus further determines a type of a service that is linked to the matching object model based on information associated with the matching object model, and causes an action supporting a provision of the service to a user taking account of the determined type of service. (action 113) Causing an action might comprise offering the service to a user of the mobile device based on the associated information and taking account of the determined type of service, but it could also be only a support for offering the service to a user.

Figure 3:
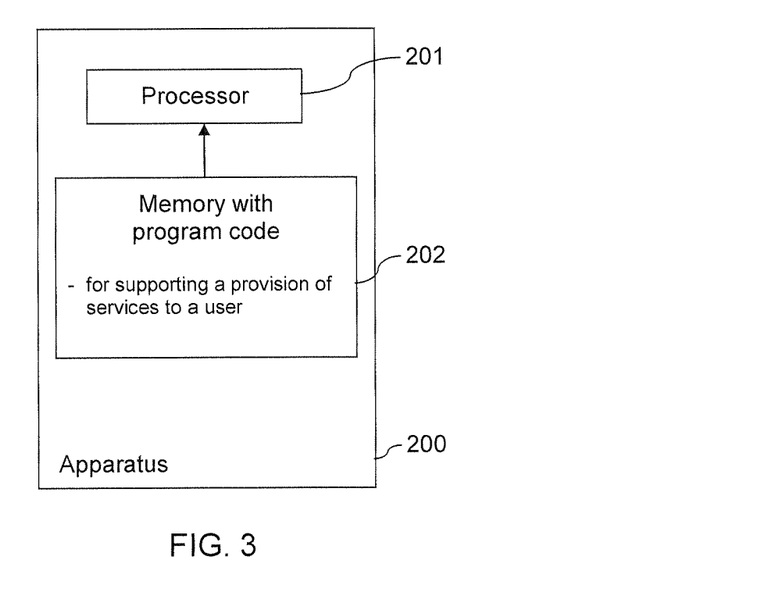
FIG. 3 is a schematic block diagram of an exemplary embodiment of an apparatus according to the second aspect of the invention.

FIG. 3 is a schematic block diagram of an apparatus 200. Apparatus 200 comprises a processor 201 and, linked to processor 201, a memory 202. Memory 202 stores computer program code for supporting a provision of services to a user of a mobile device. Processor 201 is configured to execute computer program code stored in memory 202 in order to cause an apparatus to perform desired actions.

Apparatus 200 could be a stationary device like a personal computer or a server, or a mobile device like a mobile phone, a camera or a laptop. Apparatus 200 could equally be a module for a device, like a chip, circuitry on a chip or a plug-in board. Apparatus 200 is an exemplary embodiment of any apparatus according to the second aspect of the invention. Optionally, apparatus 200 could have various other components, like a further memory, a further processor, a receiver/transmitter or any other interface supporting an exchange of data with other devices, a mobile communication interface, an interface for a local radio link, a user interface, a still image camera, a video camera, a multiview camera, a stereo camera, other depth mapping sensors, a satellite signal receiver, a memory card slot, a universal serial bus (USB) receptacle or an interface for any other kind of removable media, an interface for any other kind of local connectivity, etc.

Figure 4:
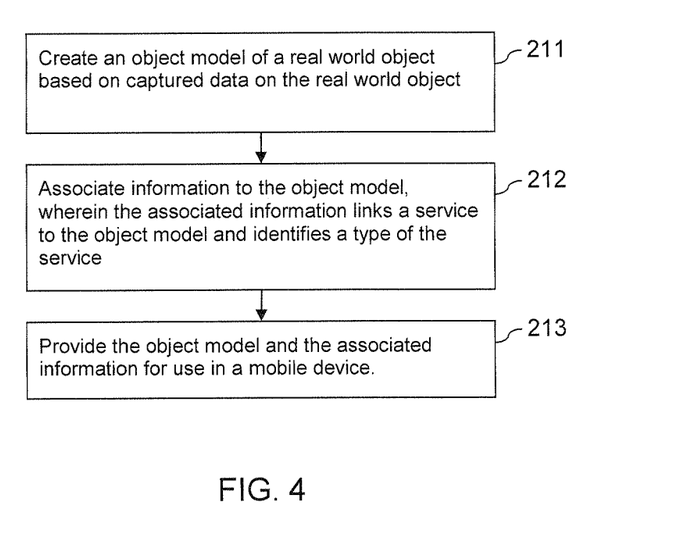
FIG. 4 is a flow chart illustrating an exemplary operation in the apparatus of FIG. 3.

An operation of apparatus 200 will now be described with reference to the flow chart of FIG. 4. The operation is an exemplary embodiment of a method according to the second aspect of the invention. Processor 201 and the program code stored in memory 202 cause an apparatus to perform the operation when the program code is retrieved from memory 202 and executed by processor 201. The apparatus that is caused to perform the operation can be apparatus 200 or some other apparatus, in particular a device comprising apparatus 200.

The apparatus creates an object model of a real world object based on captured data on the real world object. (action 211)

The apparatus furthermore associates information with the object model. The associated information links a service to the object model and identifies a type of the service. (action 212)

The apparatus furthermore provides the object model and the associated information for use in a mobile device. (action 213)

Certain embodiments of the invention may enable an apparatus to link a service to a model of a real world object and other embodiments of the invention may enable the same or another apparatus to make use of such a link. This may have the effect that the value of a real world object is augmented. Certain embodiments of the invention may enable an apparatus to differentiate between different types of services. This may have the effect that object recognition may be used for offering services to a user in a generic way. That is, there is no need to create a different approach for different real world objects, different services or different service providers. Certain embodiments of the invention may enable an apparatus to use object recognition based on captured data on real world objects. This may have the effect that a service may be provided for any real world object, regardless of whether the object is networked, tagged in some way or assumed to be at a particular location for object recognition. Certain embodiments of the invention may enable an apparatus to monitor the environment of a mobile device in view of object models stored in the mobile device. This may have the effect that real world objects may be recognized independently of any server. Apparatus 100 illustrated in FIG. 1 and the operation illustrated in FIG. 2 may be implemented and refined in various ways. Apparatus 200 illustrated in FIG. 3 and the operation illustrated in FIG. 4 may be implemented and refined in various ways.

An object model may be data representing a real world object with arbitrary accuracy, and it can be created based on captured data on a real world object using any suitable modeling approach, for instance by any known or future computer vision technique. An object model can be created for instance based on one or more images captured of a real world object, for instance based on a video clip, or based on data resulting from a scanning of a real world object, etc. That is, it could also be created based on other captured data on a real world object than image data, in particular any sensor data reflecting structural details of a real world object. An object model can be created with or without input of a user. The object model may be a three-dimensional model of a real world object, but it could equally be a two-dimensional model of a real world object. Using a three-dimensional object model may have the effect that an object reflected in the data may be recognized to correspond to a stored model with a higher reliability and more independently of the angle at which data of the real world objects are captured. The means that capture the data that is used for creating an object model may be a still image camera or a video camera, but equally a multiview or stereo camera or any other depth mapping sensors providing data that may be fed into a three-dimensional object model creation process. Using such depth mapping sensors may have the effect that their data may allow for a more accurate modeling than two-dimensional images.

The evaluation whether the captured data can be matched to a stored object model can be based on any known or future object recognition technique, for instance some computer vision technique. It may be based on a single image, on a sequence of images, for instance images from a video clip, or on data from depth mapping sensors. Using a video clip or data from depth mapping sensors may have the effect that more information on a real world object is available than from a single image, in particular information on a third dimension of the real world object that may be exploited in matching the captured data to stored 3D object models or data from different angles that may be exploited in matching the captured data to stored 2D object models. Using video clips or other continuously captured sensor data may moreover have the effect that the environment can be tracked without gaps, for instance in order to automatically detect any real world object for which an object model is stored. Using a single image or a single set of other captured data for the matching may have the effect that less processing power is required. The use of a sequence of images or of sets of other captured data taken at regular intervals may be a compromise between the other two alternatives.

The information that is associated with an object model may comprise at least one service description that is attached to the object model and that specifies how a mobile device can find an augmentation related to the object.

The service that is linked by the information to an object model could be any type of service that may be offered via a mobile device. Different types of services could comprise for instance a presentation of information, an access to a Web site or local execution of an application. Thus, the serviced may be a networked service or a local service residing on the client side. Another type of service could be any service that are offered by a particular application or service, when the particular application or service is informed about a matching object and associated information. That is, in this case, the type of service may define the application or service that should be notified. It is to be understood that various other types of services could be used as well.

Furthermore, a service could be invoked in many ways. A simple mechanism could be a normal Web based mechanism, like a uniform resource identifier (URI) to a service page, for general purpose retrieval of information regarding the object, a Web service or application description language based mechanisms for general purpose Web application invocation, or some description of a local application to start to interact with the object. The platform implementation could choose a suitable description format, either a generic one that is mapped to system specific descriptions or simply several descriptions with each description covering a single supported application platform.

Accordingly, the information associated with an object model for linking a service to the object model could be of different kinds.

In an exemplary embodiment the information associated with an object model comprises a link to a Web site, for instance in the form of an Internet protocol (IP) address or a URI. In an exemplary embodiment the information associated with the at least one object model comprises a link to a service application programming interface (API), for instance a Web service confirming to the representational state transfer constraints (RESTful), in which a mobile device could be running an application related to the service. In an exemplary embodiment the information associated with the at least one object model comprises static information for presentation to a user. In an exemplary embodiment the information associated with the at least one object model comprises information supporting a local discovery using, for instance, multicast domain name system (mDNS), or supporting a web based service discovery mechanisms, such as domain name system (DNS). In an exemplary embodiment the information associated with the at least one object model could be based on Atom Publishing Protocol, or Web Services Description Language 2.0. In an exemplary embodiment the information associated with the at least one object model could relate to local device means depending on the target platform. In an exemplary embodiment the information associated with the at least one object model comprises an identification of an application of the mobile device that is to be executed. In this case, the information could include as well a command to execute the application, but such a command could also be specified on a general basis for handling this type of service. In an exemplary embodiment the information associated with the at least one object model comprises a script for an application for execution on the mobile device. In an exemplary embodiment the information associated with the at least one object model comprises a script for an interactive application for execution on the mobile device, for instance a HyperText Markup Language (HTML) based interactive application. The latter examples may have the effect that such applications may not need any server communication in order to provide a service.

The type of a service that is linked to an object model could be determined directly or indirectly from information associated with the object model. In an exemplary embodiment, the information associated with the object model could comprise an identifier of the type of service. In another exemplary embodiment, the information associated with the object model could have a format that allows deducing a type of service to which it relates. It could comprise for instance an Internet address indicating that the service is of a type offering an access to a Web site. In another exemplary embodiment, the object model and the information associated with the object model could be stored in a database using a certain structure for each entry, with information relating to services of different types being stored at different places of the structure.

The type of service could be used by a general purpose mechanism for selecting one of a plurality of handler mechanisms. The code in memory 102 of apparatus 100 could comprise for instance code for at least a first handler application configured to, with the at least one processor, cause the apparatus to offer a service of a first type and a second handler application configured to, with the at least one processor, cause the apparatus to offer a service of a second type, and code for a general purpose application configured to, with the at least one processor, cause the apparatus to select in response to the determined type of service one of the at least first and second handler application for offering the service that is linked to the matching object model to the user of the mobile device. A general purpose application could be fixed and support a certain number of predetermined types of services. Alternatively, a general purpose application could be adaptive. For instance, if an additional handler application is to be installed in the mobile device for supporting an additional type of service, the installation process may take care of supplementing the general purpose application with an identifier of the new type of service and a name of or a link to the new handler application that that can be used for running the handler application.

The type of service that is identified by the information associated with an object model could also define how a service is to be offered to a user. The service could be provided automatically when a matching object model is found, for instance by accessing a Web site or by running an application, or the user could at first be informed about the service and the service could only provided upon a confirmation by the user.

In an exemplary embodiment, the information associated with at least one of the at least one object model stored in the mobile device comprises additional information that is considered when evaluating whether the captured data can be matched to an object model stored in the mobile device. An example for such additional information might be an indication of a certain location, which may be compared to the current location of the mobile device. Another example for such additional information might be an indication of a certain time of day, which may be compared to the current time of day. Such additional information may have the effect of reducing the number of stored models that have to be considered in the evaluation. Such additional information may further have the effect of enabling a differentiation between a large number of similar real world objects at different locations.

The at least one object model stored in the mobile device can be obtain at the mobile device in various ways.

In an exemplary embodiment the at least one object model stored in the mobile device is obtain at the mobile device by requesting an object model from another device. The other device could be another mobile device or a stationary device. An object model could be requested from another device via a direct wired or wireless link, for instance via a Bluetooth connection. If the other device is connected to a network, for instance the Internet or a local network, an object model could be requested from the other device via the network. If the other device is connected to the Internet, a model could be requested from a Web site provided by the other device, for example a Web site of a manufacturer of electronic devices. If the other device is connected to a local network, a model could be obtained for instance using a conventional service discovery. In an exemplary embodiment the at least one object model stored in the mobile device is obtain at the mobile device by requesting an object model from another device based on the current location of the mobile device. This may have the effect that a mobile device may be provided with various object models that could be matching to real world objects at a certain location. Alternatively, object models may be requested for instance for a particular topic, like cars, monuments, public transportation, etc. Alternatively, object models may be requested for a particular real world object or for a particular kind of real world objects, like a particular television set. In an exemplary embodiment the at least one object model stored in the mobile device is obtain at the mobile device by requesting an object model from another device based on a captured video clip. This may have the effect that the object model can be created individually based on the current needs of a particular user and thus to allow anyone to create rich augmented spaces anywhere.

In a further exemplary embodiment, available object models are provided to the mobile device automatically by another device, for instance based on some criteria such as topic, location, user's interests, date and/or time.

In a further exemplary embodiment the at least one object model stored in the mobile device is obtain at the mobile device by retrieving an object model from a removable memory device, like a USB stick or a memory card. This may have the effect that a user could buy for instance a real time object that is sold along with a memory device already storing an object model and associated information on a linked service. Such a service could be a service facilitating an interaction with the real world object, if the real world object is a device enabling some kind of communication, or a service providing an easy access to up to date information on the real world object, like an online user manual.

In a further exemplary embodiment the at least one object model stored in the mobile device is obtain at the mobile device by a user controlled modeling of an object within the mobile device.

Associated information linking a particular service to the model could be created by the user, for instance by entering an address of a particular Web site, or be requested from another device, like a server. Alternatively, it could be provided by another device, either along with a model or separately. Like the model, the associated information could be provided by another device automatically or upon request.

Apparatus 200 could provide the object model and the associated information for use in a mobile device in various ways. In an exemplary embodiment, the object model and the associated information are stored on a removable memory for use by mobile devices. In an exemplary embodiment, the object model and the associated information are stored in a memory in apparatus 200 or accessible by apparatus 200 and provided to a mobile device upon request by the mobile device, for instance via some network like the Internet or a local network. In an exemplary embodiment, the object model and the associated information are provided to a server for storage in a network memory and for download by mobile devices. In an exemplary embodiment, the object model and the associated information are immediately transmitted to a mobile device via a direct wired link, a direct wireless link or via a network, for example in case the object model was created specifically upon request by the mobile device.

Apparatus 100 and apparatus 200 could also be integrated in a single mobile device. Furthermore, the components of apparatus 100 and of apparatus 200 could also be integrated in a single apparatus. In this case, components of apparatus 100 and of apparatus 200 could optionally be used in common. For instance, a single processor could be used for executing the computer program code of apparatus 100 and apparatus 200, with the computer program code(s) stored in the same memory or in different memories. In this case, the object model and the associated information can be provided for use in a mobile device simply by storing the object model and the associated information in the mobile device.

Figure 5:
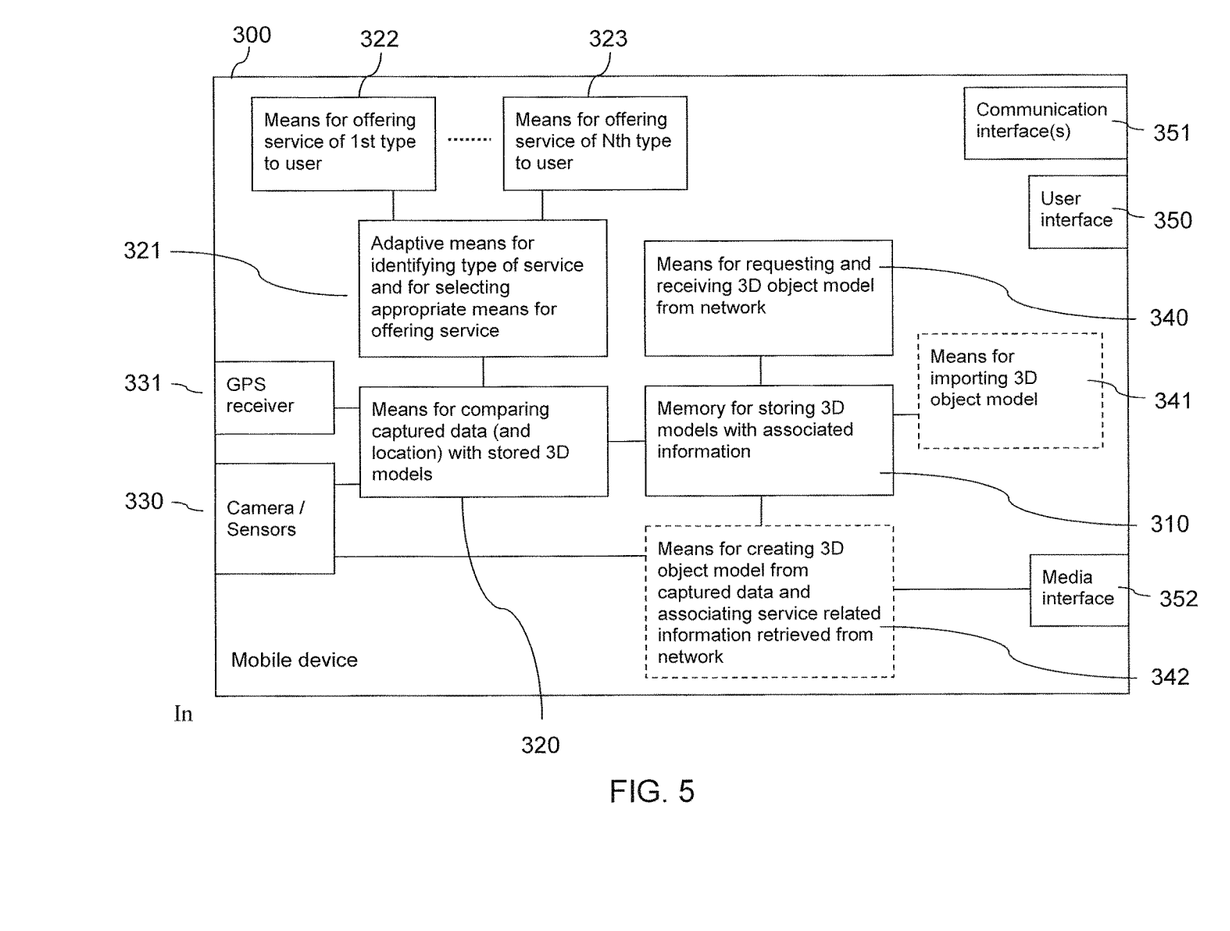
FIG. 5 is a schematic block diagram of a further exemplary embodiment of an apparatus according to the invention.
Figure 6:
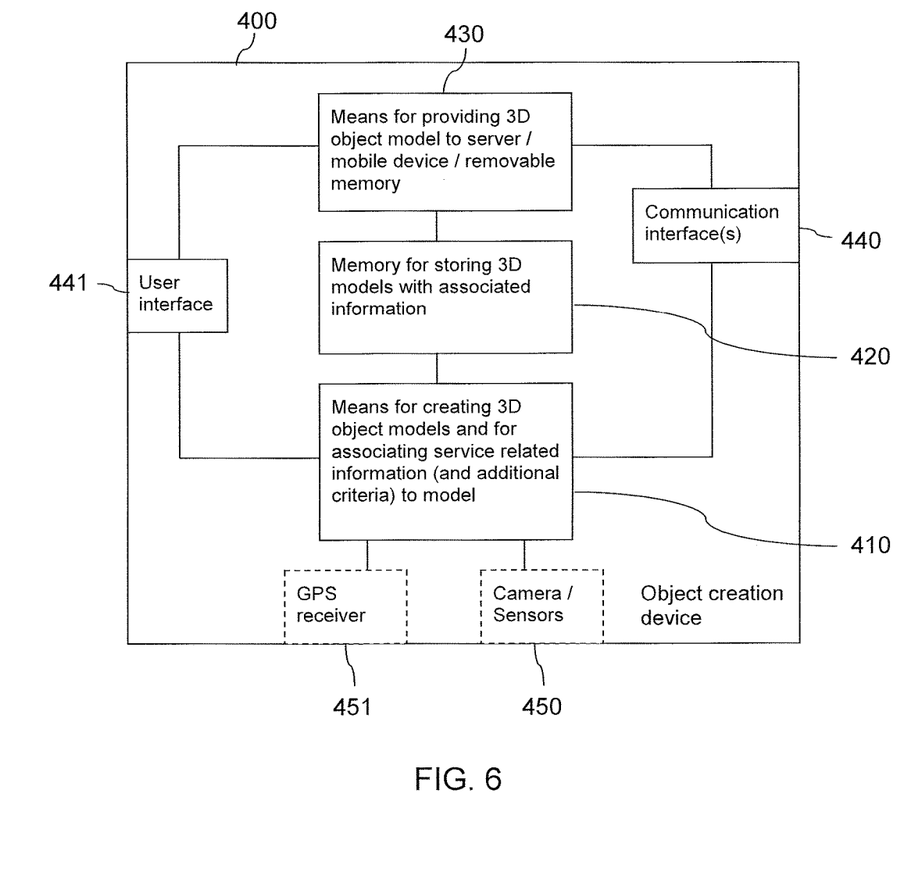
FIG. 6 is a schematic block diagram of a further exemplary embodiment of an apparatus according to the invention.

FIG. 5 is a schematic block diagram of a mobile device 300 supporting at least a use of stored object models, and FIG. 6 is a schematic block diagram of an object creation device 400 supporting the creation of object models. Certain embodiments of the devices of FIGS. 5 and 6 could be parts of a system according to the invention and interact with each other.

Mobile device 300 of FIG. 5 could be for instance a mobile phone.

Mobile device 300 comprises a memory 310 for storing 3D object models with associated information.

Mobile device 300 further comprises means 320 for comparing captured data, for example captured image data, with 3D object models stored in memory 310, optionally considering the current location of mobile device 300 in view of the information associated with the 3D object models in memory 310.

The captured data could be provided by a camera or other sensors 330. The camera could be a video camera, a still image camera or a multiview or stereo camera. The sensors could be any depth mapping sensors that are configured to capture data that may be used for 3D object model creation, for instance infrared or radar based proximity sensors. The camera and any other object capturing means 330 could be a part of mobile device 300 or be external to mobile device 300.

The location of mobile device 300 could be provided by a global positioning system (GPS) receiver 331 or any other kind of satellite signal receiver. The GPS receiver 331 could belong to mobile device 300 or be an accessory to mobile device 300.

Mobile device 300 further comprises means 321 for identifying a type of service that is linked to a model and for selecting appropriate means for offering this service.

Mobile device 300 further comprises means 322, 323 for supporting a provision of various types of services 1 . . . N to a user, with N being a natural number greater zero.

Means 322, 323 could be considered to be at least first means for supporting a provision of a service of a first type and second means for supporting a provision of a service of a second type, and means 321 could be considered to be means for selecting, in response to the determined type of service, one of the at least first and second means for supporting a provision of a service for offering or for supporting the offering of the service that is linked to the matching object model to the user of the mobile device.

In an exemplary embodiment, a respective (N+1)$^{th}$ means for supporting a provision of an additional type of service may be added as needed to means 322, 323. For such an embodiment, means 321 could be adaptive in that it may be supplemented for mapping the new type of service to the new means for supporting a provision of the additional type of service.

Mobile device 300 further comprises means 340 for requesting and receiving 3D object models from a network server. Alternatively or in addition, mobile device 300 could comprise means 341 for importing 3D object models from removable media, for instance from a memory stick or from a memory card, and/or using any other local import mechanism, for example a local radio link. Alternatively or in addition, mobile device 300 could comprise means 342 for creating 3D object models from captured images or other captured data and for associating service related information retrieved from a network server to the 3D object models.

Mobile device 300 further comprises a user interface 350, at least one communication interface 351 and a media interface 352. The user interface 350 may comprise output means like a display and loudspeakers, and input means, like a key board or a touch screen. The at least one communication interface 351 may comprise a cellular transceiver, a wireless local area network (WLAN) transceiver, a Bluetooth transceiver, etc. The media interface 352 could be for instance a memory card slot or a USB receptacle.

Each of means 320, 321, 322, 323, 340, 341 and 342 could be a respective circuit implemented in hardware. In this case, means 320, 340, 341 and 342 could be linked to memory 310; means 320 could be linked in addition to camera/sensors 330, receiver 331, user interface 350 and means 321; means 321 could be linked in addition to means 322 and 323; means 322 and 323 could be linked in addition to user interface 350 and communication interface 351; means 340 could be linked in addition to camera/sensors 330, receiver 331, user interface 350 and communication interface 351; means 341 could be linked in addition to receiver 331 and user interface 350; and means 342 could be linked in addition to camera/sensors 330, receiver 331, user interface 350, communication interface 351 and media interface 352.

Possible connections of the user interface 350 and of communication interface 351 are not shown in FIG. 5 due to reasons of clarity.

Alternatively, means 320, 321, 322, 323, 340, 341 and 342 could be implemented in the form of a processor and a memory storing software code for execution by the processor to cause an apparatus to perform the desired actions, similarly as described for processor 101 and memory 102 of apparatus 100 of FIG. 1. In this case, the processor could be linked to memory 310, camera/sensors 330, satellite signal receiver 331, user interface 350, communication interface 351 and media interface 352.

Blocks 320, 321, 322, 323, 340 and 341 of FIG. 5 could also be understood to represent exemplary functional blocks of one or more computer program codes.

Object creation device 400 of FIG. 6 could be for instance a stationary device or a mobile device of a manufacturer of electronic devices as exemplary real world objects, a server connected to the Internet or a server or any other device in a local network.

Device 400 comprises means 410 for creating 3D object models from data on real world objects and for associating service related information, and optionally additional information, to the created models. The required data could be received for instance via a communication interface 440 of device 400 and/or a user interface 441 of device 400 and/or be provided by a video camera, a multiview camera, a stereo camera, or by other depth mapping sensors 450 and/or a GPS receiver 451 or any other kind of satellite signal receiver. Camera/sensors 450 and GPS receiver 451 could be internal or external to device 400.

Device 400 further comprises a memory 420 for storing 3D object models created by means 410 with associated information.

Device 400 further comprises means 420 for providing 3D object models and associated information created by means 410 and/or stored in memory 420 to a server, to a mobile device or to a removable memory. Providing the data could be controlled by a user via user interface 441 and/or via communication interface 440. If the data is provided to a server or directly to a mobile device, this could equally be performed via communication interface 440. Storing the data in a removable memory could be performed via a media interface of device 400 not shown.

Each of means 410 and 430 could be a respective circuit implemented in hardware. In this case, both means 410 and means 430 could be linked to memory 420, user interface 441 and communication interface 440; means 410 could be linked in addition to camera/sensors 450 and/or GPS receiver 451; camera/sensors 450 and/or receiver 451 could be linked in addition to user interface 441; and means 430 could be linked in addition to means 410 and/or a media interface.

Alternatively, means 410 and 430 could be implemented in the form of a processor and a memory storing software code for execution by the processor to cause an apparatus to perform the desired actions, similarly as described for processor 201 and memory 202 of apparatus 200 of FIG. 3. In this case, the processor could be linked to memory 420, camera/sensors 450, satellite signal receiver 451, user interface 441, communication interface 440 and media interface.

Blocks 410 and 430 of FIG. 6 could also be understood to represent exemplary functional blocks of one or more computer program codes.

It is to be understood that each of the means presented in FIGS. 5 and 6 could comprise a single means or a plurality of means. For instance, means 410 could comprise first means for creating 3D object models, and second means for associating service related information to the a respective model. It is further to be understood that some of the means presented in FIGS. 5 and 6 as separate means could be implemented as a single means. For instance, means 321-323 could be a single means, in particular if the supported types of services is predetermined and not adaptive. Alternatively or in addition, means 320 and 321 could be implemented as a single means. It is further to be understood that the means could be configured to perform the indicated functions with a different distribution. For instance, instead of means 321, means 320 could be responsible for determining the type of a service that is linked to a matching 3D object model.

Figure 7:
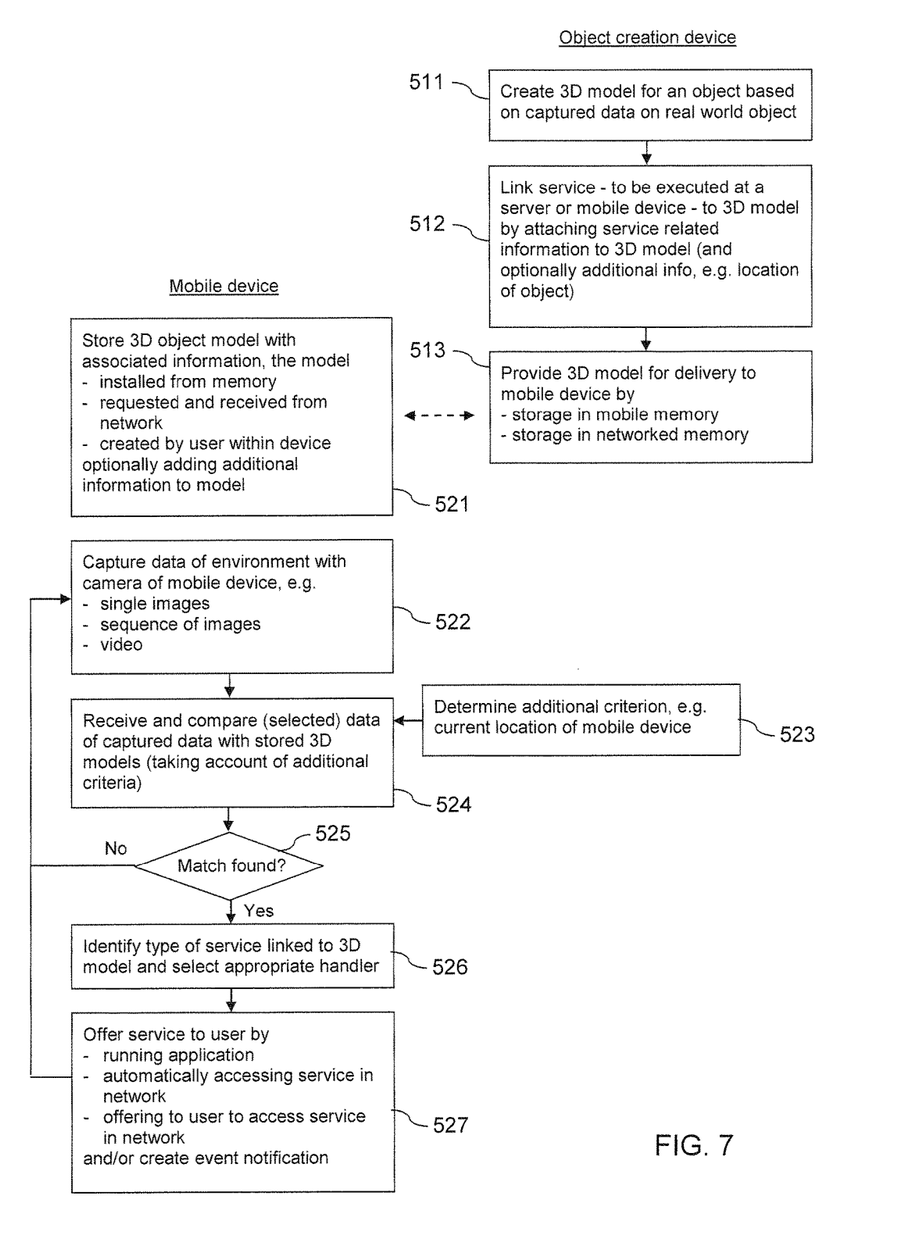
FIG. 7 is a flow chart illustrating an exemplary operation in the apparatuses of FIGS. 5 and 6.

An exemplary operation in a system comprising a respective embodiment of the devices 300, 400 of FIGS. 5 and 6 will now be described with reference to the flow chart of FIG. 7. Operations at mobile device 300 are presented essentially on the left hand side of FIG. 7, and operations at device 400 are presented essentially on the right hand side of FIG. 7.

Device 400 creates a 3D object model for a real world object using means 410. (action 511) The real world object can be a specific, unique real world object or a representative specimen of a plurality of identical real world objects, for instance of certain electronic devices, like a particular kind of television set. The 3D object model can be created for example based on a video clip received from some mobile device 300 via communication interface 440, or based on data taken by a camera or any other object capturing means 450 of device 400.

Means 410 of device 400 further links a service to the 3D object model by associating service related information to the 3D object model. (action 512) The service has been set up for augmenting the real world object. The service related information could comprise an Internet address that may be accessed, textual and/or graphical information on the real world object that may be presented to a user of a mobile device, a script of an application for execution at a mobile device, a command to run an application installed at a mobile device, etc. The associated information provides an indication of the type of service that is linked to the 3D object model, for instance by including in addition an identifier of the service type. There could be a convention, for instance, that automatically accessing a particular Web site is a service of type "1", offering an access to a Web site is a service of type "2", automatically presenting information to a user is a service of type "3", automatically executing a script included in the associated information is a service of type "4", automatically notifying a particular application that offers the service about the service related information is a service of type "5", etc.

In addition, means 410 of device 400 could include further information in the information that is associated with the model, for instance an indication of the location of the real world model.

A created 3D model and associated information may be stored by means 410 in memory 420 of device 400 or be provided to means 430 for immediate distribution.

Means 430 of device 400 provides the 3D object model and the associated information for delivery to a mobile device. (action 513) This could be achieved for instance by retrieving the 3D model and associated information from memory 420 and by storing the 3D object model in a removable memory that is to be delivered to a mobile device along with a specimen of the modeled real world object. The action could be controlled by a user of device 400 via user interface 441. Alternatively, means 430 could provide the 3D object model and associated information for storage of the data in a networked memory that can be accessed by a server using communication interface 440. The action could be controlled again by a user of device 400 via user interface 441. Further alternatively, for instance if device 400 is a server that can be accessed by mobile devices via a network, means 430 of device 400 could extract a 3D object model from memory 420 upon request by a mobile device and provide the 3D object model and associated information for transmission to the requesting mobile device via the network using communication interface 440.

It may be noted that this approach enables even third parties to provide augmentations for any object for which they can create a model of a real world object. For example, anyone could set up a "Volvo car" service that is linked to a model of a Volvo.

Mobile device 300 stores a 3D model of a real world object with associated information in memory 310. (action 521)

The 3D object model can be installed for instance by means 341 of device 300 from a removable memory that is connected to media interface 352 and that has previously been written by device 400 and provided to the user of mobile device 300 along with a specimen of a real world object, for instance a television set. Means 341 of mobile device 300 could add additional pieces of information to the 3D object model, for instance the location at which the real world object is placed. The location can be determined by GPS receiver 331 when mobile device 300 is in close vicinity to the real world object. The process may be controlled by a user via user interface 350.

Alternatively, the 3D object model could be requested and received by means 340 of device 300 from a server in a network. The 3D object model could be requested in many ways.

A user could select a particular kind of real world object, and the server could provide a corresponding model. For instance, a user could request and receive a 3D model for a particular kind of television set or for a particular type of car, or 3D models for all bus stops in a particular city, etc. The 3D object model and the information associated with the 3D object model could then be selected by the addressed server based on the request. The server could have received the 3D object model and the associated information for instance from device 400 in action 513. The 3D object model and associated information could be stored in memory 310. Additional information, if any, could be provided by the server or be generated locally at device 300, for instance by GPS receiver 331.

In a variation of a server based approach, the user of device 300 could request creation of a 3D model for a particular real world object based on a video clip taken with the video camera 330 of mobile device 300. The video clip could be provided by means 340 to a server, for instance a server in the form of device 400, and means 340 could receive a corresponding 3D object model in response. The same approach could be used with data captured by any other camera or depth mapping sensors. The information associated with the 3D object model could be entered by the user manually, or be downloaded from the same or some other server. Means 340 of mobile device 300 may then take care of associating the information with the 3D object model and of storing both in memory 310.

In a further variation of a server based approach, means 340 of mobile device 300 could request a server to provide available 3D object models for real world objects at the current location of mobile device 300. The location of mobile device 300 could be provided by mobile device 300, for instance based on measurements of GPS receiver 331. Alternatively, the area in which mobile device 300 is located could be provided by some cell based location service in the network.

Further alternatively, the 3D object model could be received at mobile device 300 from another device, for instance from another mobile device, via a local radio link or any other kind of a local connection.

Further alternatively, means 342 of mobile device 300 could create a 3D object model locally, based on images of a real world object captured with video camera 330 or based on data of a real world object captured with any other kind of camera or sensors. Means 342 could furthermore associate service related information retrieved from a network with the created 3D object model and store the data in memory 310. The process may be controlled again by a user via user interface 350. In a variation, the service related information could equally be entered by a user via user interface 350.

Action 521 is a preparatory action at mobile device 300 that may be performed independently of further actions 522-526, either once or several times.

For using the stored 3D object models, mobile device 300 captures images or other data of the environment, for instance using video camera 330 or any other means that are configured to detect objects in the environment. (action 522)

Alternatively, images or other data could be captured with a separate means, for instance a head mounted device with camera that is linked to mobile device 300 either by wire or wirelessly. The captured data can be a single set of data captured upon input by a user, like a single image, a sequence of sets of data captured at fixed intervals, like a sequence of images, for instance once per second or less often, or continuously captured data, like a video clip.

The captured data is provided to means 320 of mobile device 300. Optionally, the captured data is not provided entirely to means 320. It would be possible, for instance, that a user first selects a particular part of an image in which he/she is interested.

In addition, mobile device 300 may determine some additional criterion. It may determine for instance the current location of mobile device 300 using GPS receiver 331 or the current time, etc. (action 523)

Means 320 of mobile device 300 receive the captured data and compares the data with stored 3D object models in memory 310. (action 524) If additional information is associated with a 3D object model, this information may be compared in addition with the criterion determined in action 523. That is, a matching 3D object model may only be assumed to be found if the captured data matches the 3D object model and the additional information corresponds to the additional criterion.

If no match between the captured data and a stored 3D object model is found, or if no such 3D object model is found with associated additional information meeting some additional criterion, if any, (action 525) mobile device 300 continues with actions 522 and 523.

If a match between the captured data and a stored 3D object model is found and if any associated additional information meets some additional criterion, if any, (action 525), means 321 of mobile device 300 identifies the type of service linked to the selected 3D object model by evaluating the associated information. Based on the determined type of service, means 321 selects one of means 322 and 323 as appropriate means for handling the service that is linked to the 3D object model (action 526).

Selected means 322 or 323 then offers the service that is linked to the 3D object model to the user of mobile device 300. (action 527) The actual service is identified by the information associated with the selected 3D object model. If the information comprises a script, offering the service may comprise running the script. Such a script could provide for instance a user interface for some electronic device corresponding to the detected real world object. If the information comprises an URI, offering the service may comprise automatically accessing the associated Web site or offering to the user of mobile device 300 to access the associated Web site upon confirmation. If the information comprises textual and/or graphical information, offering the service may comprise presenting the information to the user, etc.

Some of the means 322 or 323 may not offer a service directly to a user but only support a provision of a service. Some of the means 322 or 323 might be implemented for instance for creating an event notification to an application or service internal or external of device 300. The notification could be used for providing the application with the information that is associated with the matching object model and other criteria. The notified application or service may then take care of actually offering the correct service to the user by evaluating the received information. This may have the effect that a significant part of a service logic may be provided by independent third party applications and services. The type of service determined in action 526 may in this case be a type of service that requires creation of an event notification to a particular application or service.

Thus, when establishing the infrastructure for distributing object models, the receiving device may also be implemented to be able to decide which services are offered by itself and which may just be passed on to some external application or service. The object models may incorporate a corresponding service descriptor in a fashion that the receiving device knows what to do with the object model and its service description.

Since dedicated means 322, 323 are provided for each type of service, any type of service may be handled appropriately.

To provide an example for object recognition that is limited by additional information, including a criterion or a rule, mobile device 300 could recognize a particular type of television set only whenever mobile device 300 is in a "Home" location. Then, an application that is called as a service linked to the model of the particular type of television set could provide remote control functionality for the particular type of television set, or, as another service accessing a Web site, provide for instance the local television schedule information.

The additional criterion determined in action 523 could not only be used as an additional criterion for selecting a 3D object model in memory 310; it could also be used as a parameter for a service that is linked by the associated information to a matching 3D object model. To provide an example, the real world object could be a bus stop, and the linked service could be the current bus schedule that is provided by the operator via a Web site. If the form of various bus stops is the same and all of these bus stops thus match the same 3D object model, the location of mobile device 300 and thus of the currently captured bus stop could be used as a parameter for the service so that the schedule for the correct bus stop is presented automatically.

The service could be offered directly on top of views of the real world, for instance using a head mounted near eye display device. Such a device could be mobile device 300 or be linked in a suitable manner to mobile device 300. The display device could present the user with an augmented view where images, either still images or live camera viewfinder images, have objects augmented with information, with links to information related to them, with ways to access services related to them, or with ways to start applications related to them. It is to be understood, however, that the service could also be offered in any other way, for instance on the display of a hand-held mobile device 300. It is further to be understood that the service could also be presented independently of the captured data, for instance by providing a user interface designed for interacting with an object for which a matching object model is found. In certain embodiments, images corresponding to the captured data might not necessarily be presented to the user at all; the captured data could only used for monitoring the environment in the background. Furthermore, the service could not only be offered visually. It could be offered for instance by an audio output via loudspeakers or a headset of mobile device 300.

It is to be understood that it may also be possible to check whether the captured data matches with more than one 3D object model in memory 310. It would then be possible to offer associated services to the user simultaneously.

In exemplary embodiments, it would also be possible to allow development of virtual (or remote) user interfaces (or applications) for physical objects even without the object in question actually providing any service itself.

In general, the provisioned models may be used as access mechanisms to local services and data.

In exemplary embodiments, it would also be possible to provide object based APIs for programmers to create applications that recognize objects from the users' surroundings. Summarized, certain embodiments of the invention may thus provide a general purpose mechanism for linking real world objects captured in data to different types of services. With this general purpose mechanism, a mobile device may thus store and use an individual collection of models of real world objects and associated information based on the current needs of its user, while the models and the associated information may be provided by various service providers and manufacturers of real time object, or even be created by the user himself using the mobile device or based on data provided by the user using the mobile device.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory, a random access memory, a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The functions illustrated by the processor 101 in combination with the memory 102 or the means 320 to 323 can be viewed as means for receiving captured data on an environment of a mobile device; means for evaluating whether the captured data can be matched to an object model stored in the mobile device, the mobile device storing at least one object model and associated information, wherein the associated information links a service to the object model and identifies a type of the service; and means for determining, when a matching object model is found, a type of a service that is linked to the matching object model based on information associated with the matching object model, and causing an action supporting a provision of the service to a user taking account of the determined type of service.

The functions illustrated by the processor 201 in combination with the memory 202 or the means 410 and 430 can be viewed as means for creating an object model of a real world object based on captured data on the real world object; means for associating information to the object model, wherein the associated information links a service to the object model and identifies a type of the service; and means for providing the object model and the associated information for use in a mobile device.

The program codes in memory 102 or memory 202 can also be viewed as comprising such means in the form of functional modules.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an exemplary embodiment in a particular category may also be used in a corresponding manner in an exemplary embodiment of any other category.

What is claimed is:

1. A method comprising:
   receiving captured data on an environment of a mobile device;
   evaluating whether the captured data can be matched to an object model stored in the mobile device, the mobile device storing at least one object model and associated information, wherein the associated information, created by a user or provided by another device, links a service to the object model, identifies a type of the service, and comprises additional information related to location information that is considered when evaluating whether the captured data is able to be matched to an object model stored in the mobile device, wherein the at least one object model is obtained for storage in the mobile device by requesting an object model from another device based on a current location of the mobile device; and
   when a matching object model is found, determining, with at least one processor, a type of a service that is linked to the matching object model based on information associated with the matching object model, and causing an action supporting a provision of the service to the user based on the determined type of service.

2. The method of claim 1, wherein the object model is a three-dimensional model of a real world object.

3. The method of claim 1, wherein the information comprises at least one of:
   a link to a Web site;
   a link to a service application programming interface;
   information for presentation to the user;
   information supporting a local service discovery;
   an identification of an application of the mobile device that is to be executed;
   a script for an application for execution on the mobile device.

4. The method of claim 1, wherein the at least one object model is obtained for storage in the mobile device by one of:
   requesting an object model from another device;
   requesting an object model from another device in a network;
   requesting an object model from another device based on a captured video clip;
   retrieving an object model from a memory device; and
   a user controlled modeling of an object within the mobile device.

5. An apparatus comprising at least one processor and at least one non-transitory memory including computer program code, the at least one memory and the computer program code configured to, with the at least one processor, cause the apparatus at least to:
   receive captured data on an environment of a mobile device;
   evaluate whether the captured data can be matched to an object model stored in the mobile device, the mobile device storing at least one object model and associated information, wherein the associated information, created by a user or provided by another device, links a service to the object model, identifies a type of the service, and comprises additional information related to location information that is considered when evaluating whether the captured data is able to be matched to an object model stored in the mobile device, wherein the at least one object model is obtained for storage in the mobile device by requesting an object model from another device based on a current location of the mobile device; and
   when a matching object model is found, determine a type of a service that is linked to the matching object model based on information associated with the matching object model, and cause an action supporting a provision of the service to the user based on the determined type of service.

6. The apparatus of claim 5, wherein the object model is a three-dimensional model of a real world object.

7. The apparatus of claim 5, wherein the information comprises at least one of:
   a link to a Web site;
   a link to a service application programming interface;
   information for presentation to the user;
   information supporting a local service discovery;
   an identification of an application of the mobile device that is to be executed;
   a script for an application for execution on the mobile device.

8. The apparatus of claim 5, wherein the at least one memory and the computer program code are further configured to, with the at least one processor, cause the apparatus at least one of:
   to request an object model from another device;
   to request an object model from another device in a network;
   to request an object model from another device based on a captured video clip;
   to retrieve an object model from a memory device; and to model an object within the mobile device in response to a user input.

9. The apparatus of claim 5, wherein the computer code comprises:
   code for at least a first handler application configured to, with the at least one processor, cause the apparatus to offer a service of a first type and a second handler application configured to, with the at least one processor, cause the apparatus to offer a service of a second type; and
   code for a general purpose application configured to, with the at least one processor, cause the apparatus to select in response to the determined type of service one of the at least first and second handler application for offering the service that is linked to the matching object model to the user of the mobile device.

10. The apparatus of claim 5, further comprising at least one of:
   a camera;
   a video camera;
   a multiview camera;
   a stereo camera;
   depth mapping sensors;
   a satellite signal receiver;
   a user interface;
   an interface for local connectivity;
   an interface for removable media;
   an interface for a local radio link; and
   a mobile communication interface.

11. The apparatus of claim 5, wherein the apparatus is one of:
   a chip;
   a mobile device;
   a mobile communication device;
   a camera; and
   a module for a mobile device.

12. An apparatus comprising at least one processor and at least one non-transitory memory including computer program code, the at least one memory and the computer program code configured to, with the at least one processor, cause the apparatus at least to perform: create an object model of a real world object based on captured data on the real world object; evaluate whether the captured data can be matched to an object model stored in the mobile device, the mobile device storing at least one object model and associated information associate information to the object model, wherein the associated information, created by a user or provided by another device, links a service to the object model, identifies a type of the service, and comprises additional information related to current location information of a mobile device that is considered when evaluating whether the captured data is able to be matched to the object model stored in the mobile device, wherein the at least one object model is obtained for storage in the mobile device by requesting an object model from another device based on a current location of the mobile device; and provide the object model and the associated information for use in the mobile device.

13. The apparatus of claim 12, wherein the object model is a three-dimensional model of a real world object.

14. The apparatus of claim 12, wherein the apparatus is one of:
   a chip;
   a mobile device;
   a mobile communication device;
   a module for a mobile device;
   a stationary device;
   a module for a stationary device;
   a server; and
   a module for a server.

15. The method of claim 1 further comprising:
   determining a current location of the mobile device; and
   evaluating whether the captured data is able to be matched to the object model stored in the mobile device based on comparing the additional information related to location information with the current location of the mobile device.

16. The apparatus of claim 5, wherein the at least one memory and the computer program code are further configured to, with the at least one processor, cause the apparatus at least to:
   determine a current location of the mobile device; and
   evaluate whether the captured data is able to be matched to the object model stored in the mobile device based on comparing the additional information related to location information with the current location of the mobile device.

17. The apparatus of claim 5, wherein the object model matches a real world object at the current location of the mobile device.

* * * * *